(12) United States Patent
Sun et al.

(10) Patent No.: US 9,048,495 B2
(45) Date of Patent: Jun. 2, 2015

(54) CATHODE ACTIVE MATERIAL COATED WITH FLOURINE COMPOUND FOR LITHIUM SECONDARY BATTERIES AND METHOD FOR PREPARING THE SAME

(75) Inventors: Yang Kook Sun, Seoul (KR); Woo Seong Kim, Shiheung (KR); Jung Min Han, Seoul (KR)

(73) Assignee: ENERCERAMIC INC., Gyeonggi-Do (KR)

( * ) Notice: Subject to any disclaimer, the term of this patent is extended or adjusted under 35 U.S.C. 154(b) by 880 days.

(21) Appl. No.: 11/918,163

(22) PCT Filed: Mar. 17, 2006

(86) PCT No.: PCT/KR2006/000987
§ 371 (c)(1),
(2), (4) Date: Oct. 10, 2007

(87) PCT Pub. No.: WO2006/109930
PCT Pub. Date: Oct. 19, 2006

(65) Prior Publication Data
US 2009/0087362 A1    Apr. 2, 2009

(30) Foreign Application Priority Data

Apr. 15, 2005   (KR) .................. 10-2005-0031309
Mar. 14, 2006   (KR) .................. 10-2006-0023501

(51) Int. Cl.
*C01D 15/00*    (2006.01)
*H01M 4/505*    (2010.01)
(Continued)

(52) U.S. Cl.
CPC ........... *H01M 4/505* (2013.01); *C01G 45/1221* (2013.01); *C01G 45/1228* (2013.01);
(Continued)

(58) Field of Classification Search
CPC .......... C01G 45/1221; C01G 45/1242; C01G 45/1228; C01G 51/42; C01G 51/50; C01G 53/04; C01G 53/50; C01P 2004/80; C01P 2002/32; C01P 2002/54; C01P 2002/72; C01P 2002/85; C01P 2004/03; C01P 2006/40
USPC ............ 423/179.5, 465; 427/212; 429/218.1, 429/137
See application file for complete search history.

(56) References Cited

U.S. PATENT DOCUMENTS 4,180,441 A  *  12/1979  Stiker et al. .................... 429/222
5,681,885 A  *  10/1997  Kinoshita et al. ............. 524/430
(Continued)

FOREIGN PATENT DOCUMENTS

AU           775446  B2  *  7/2004
CN           1572034         1/2005
(Continued)

OTHER PUBLICATIONS

S.H. Kang, et al. Layered Li(Ni0.5-x Mn0.5-x M'2x )O2 (M'=Co, Al, Ti; x=0, 0.025) Cathode Materials for Li-ion Rechargeable Batteries. Journal of Power Sources, 112 (May 13, 2002) pp. 41-48, (8 pgs.).
(Continued)

*Primary Examiner* — Rebecca Lee
(74) *Attorney, Agent, or Firm* — Foley & Lardner LLP

(57) ABSTRACT

Disclosed herein is a cathode active material coated with a fluorine compound for lithium secondary batteries. The cathode active material is structurally stable, and improves the charge-discharge characteristics, cycle characteristics, high-voltage characteristics, high-rate characteristics and thermal stability of batteries.

12 Claims, 8 Drawing Sheets

(51) Int. Cl.
| | |
|---|---|
| C01G 45/12 | (2006.01) |
| C01G 51/00 | (2006.01) |
| C01G 53/00 | (2006.01) |
| H01M 4/36 | (2006.01) |
| H01M 4/525 | (2010.01) |
| B05D 3/02 | (2006.01) |
| H01M 4/58 | (2010.01) |
| H01M 10/0525 | (2010.01) |
| H01M 4/02 | (2006.01) |

(52) U.S. Cl.
CPC ............ *C01G45/1242* (2013.01); *C01G 51/42* (2013.01); *C01G 51/50* (2013.01); *C01G 53/42* (2013.01); *C01G 53/50* (2013.01); *C01P 2002/32* (2013.01); *C01P 2002/54* (2013.01); *C01P 2002/72* (2013.01); *C01P 2002/85* (2013.01); *C01P 2004/03* (2013.01); *C01P 2006/40* (2013.01); *H01M 4/362* (2013.01); *H01M 4/525* (2013.01); *H01M 4/582* (2013.01); *H01M 10/0525* (2013.01); *H01M 2004/028* (2013.01); *Y02E 60/122* (2013.01); *C01P 2004/80* (2013.01)

(56) References Cited

U.S. PATENT DOCUMENTS

| | | | |
|---|---|---|---|
| 6,156,453 A * | 12/2000 | Shimizu et al. | 429/212 |
| 7,135,251 B2 * | 11/2006 | Cho et al. | 429/231.1 |
| 2003/0082448 A1 * | 5/2003 | Cho et al. | 429/218.1 |
| 2003/0215703 A1 * | 11/2003 | Cho et al. | 429/137 |
| 2006/0068289 A1 * | 3/2006 | Paulsen et al. | 429/231.1 |

FOREIGN PATENT DOCUMENTS

| | | |
|---|---|---|
| EP | 1 267 431 A1 | 12/2002 |
| JP | 08 264183 A | 10/1996 |
| JP | 2003-007299 | 1/2003 |
| JP | 20030059491 | 2/2003 |
| JP | 2004-363097 | 12/2004 |
| KR | 10-277796 | 10/2000 |
| KR | 20020095421 A | 12/2002 |
| KR | 20030032363 | 4/2003 |
| KR | 1020030089750 | 11/2003 |
| KR | 20030091581 A | 12/2003 |
| KR | 1020030091581 | 12/2003 |
| KR | 1020050049746 | 5/2005 |
| KR | 1020050057566 | 6/2005 |
| WO | 2004030126 | 4/2004 |

OTHER PUBLICATIONS

A. Choblet, et al. Two-Phase LiCoO2 Oxides for Rechargeable Lithium Batteries. Electrochemical and Solid-State Letters, 4 (6) (Jan. 22, 2001) pp. A65-A67 (3 pgs.).

S. Kim, et al. Electrochemical Performance of Natural Graphite by Surface Modification Using Aluminum. Electrochemical and Solid-State Letters, 4 (8) (Apr. 8, 2001) pp. A109-A112 (4 pgs.).

D. Jang, et al. Dissolution of Spinel Oxides and Capacity Losses in 4 V Li/LixMn2O4 Cells. Journal of Electrochemical Society, vol. 143, No. 7, (Jul. 1996) pp. 2204-2211 (8 pgs.).

D. Aurbach et al., "On the capacity fading of LiCoO2 intercalation electrodes: the effect of cycling, storage, temperature, and surface film forming additives", Electrochimica Acta 47 (2002), p. 4291-4306.

Y.-K. Sun et al., "Electrochemical performance of nano-sized ZnO-coated LiNi0.5Mn1.5O4 sipnel as 5 V materials at elevated temperatures", Electrochemistry Communications 4 (2002), p. 344-348.

Y.K.Sun, et al., Significant improvement of high voltage cycling behavior AlF3-coated LiCoO2 cathode, Electrochmistry communications 8, (2006), pp. 821-826.

Y.K.Sun, et al., Effect of AlF3 coating amount on high voltage cycling performance of LiCoO2, Electrochimica Acta 53 (2007), pp. 1013-1019.

S.U. Woo, et al., Significant Improvement of Electrochemical Performance of AlF3-Coated Li[Ni0.8Co0.1Mn0.1]O2 Cathod Materials, Journal of the Electrochemical Society, 154 (11), A1005-a1009 (2007).

Y.K.Sun, et al., AlF3-Coating to Improve High Voltage Cycling Performance of Li[Ni1/3Co1/3Mn1/3]O2 Cathod Materials for Lithium Secondary Batteries, Journal of the Electrochemical Society, 154 (3), A168-A172 (2007).

Yang-Kook Sun, et al., Improvement of the Electrochemical Properties of Li[Ni0.5Mn0.5]O2 by AlF3 Coating, Journal of the Electrochemical Society, 155 (10), A705-A710 (2008).

H.B. Kim, et al., Electrochemical and thermal characterization of AlF3-coated Li[Ni0.8Co0.15Al0.05]O2 cathode in lithium-ion cells, Journal of Power Sources 179 (2008), pp. 347-350.

B.C. Park, et al., Improvement of structural and electrochemical properties of AlF3-coated Li[Ni1/3Co1/3Mn1/3]O2 cathode materials on high voltage region, Journal of Power Sources 178 (2008), pp. 826-831.

Yang-Kook Sun, et al., Role of AlF3 Coating on LiCoO2 Particles during Cycling to Cutoff Voltage above 4.5 V, Journal of The Electrochemical Society, 156 (12), A1005-A1010 (2009).

Dong-Ju Lee, et al., Improvement of electrochemical properties of Li1.1Al0.05Mn1.85O4 achieved by an AlF3 coating, Journal of Power Sources, 196 (2011), pp. 1353-1357.

Ki-Soo Lee, et al., AlF3-coated LiCoO2 and Li[Ni1/3Co1/3Mn1/3]O2 blend composite cathode for lithium ion batteries, Journal of Power Sources, 196 (2011), pp. 6974-6977.

* cited by examiner

Aluminum Kα1

Fluorine Ka1_2

CATHODE ACTIVE MATERIAL COATED WITH FLOURINE COMPOUND FOR LITHIUM SECONDARY BATTERIES AND METHOD FOR PREPARING THE SAME

TECHNICAL FIELD

The present invention relates to a method for treating the surface of a cathode active material for lithium secondary batteries with superior cycle characteristics and excellent high-rate characteristics. More particularly, the present invention relates to an improvement in the charge-discharge characteristics, cycle characteristics, high-voltage characteristics and thermal stability of lithium secondary batteries by coating a cathode active material for the lithium secondary batteries with a fluorine compound.

BACKGROUND ART

Demand for rechargeable lithium secondary batteries as power sources of portable electronic devices for digital communication, such as personal digital assistants (PDAs), cellular phones and notebooks, as well as electric bicycles and electric automobiles is rapidly growing. The performance of these devices is greatly influenced by secondary batteries as key components of the devices. Accordingly, there is a strong need for high-performance batteries. Several main characteristics required in batteries are charge-discharge characteristics, cycle characteristics, high-rate characteristics, and high-temperature stability. Lithium secondary batteries have drawn attention because of their high voltage and high energy density.

Lithium secondary batteries are classified into lithium metal batteries using lithium as an anode and lithium ion batteries using an interlayer compound, e.g., carbon, capable of intercalation/deintercalation of lithium ions. Further, lithium secondary batteries are classified into liquid type batteries using a liquid electrolyte, gel type polymer batteries using a mixture of liquid and polymer electrolytes, and solid type polymer batteries using a pure polymer electrolyte according to the kind of electrolytes used.

Currently available small-size lithium ion secondary batteries use $LiCoO_2$ as a cathode material and carbon as an anode material. Lithium ion secondary batteries using $LiMn_2O_4$ as a cathode material were developed by Moli Energy Corp., Japan, but their use is negligible in comparison with that of batteries using $LiCoO_2$. Extensive research on $LiNiO_2$, $LiCo_xNi_{1-x}O_2$ and $LiMn_2O_4$ is actively underway as cathode materials. $LiCoO_2$ is a promising material in terms of its stable charge-discharge characteristics, high electronic conductivity, superior thermal stability and constant discharge voltage characteristics, but has disadvantages of insufficient cobalt deposits, high price and toxicity. For these reasons, development of novel cathode materials is needed. $LiNiO_2$ has problems that it is difficult to synthesize and is thermally unstable, which make $LiNiO_2$ unsuitable for commercialization. Commercial applications of $LiMn_2O_4$ are currently limited to some low-priced products. However, $LiMn_2O_4$ is has a spinel structure and deliverers a lower theoretical capacity (~148 mAh/g) than other active materials. In addition, $LiMn_2O_4$ has poor cycle characteristics due to the Mn dissolution into electrolyte. Particularly, since $LiMn_2O_4$ has poor high-temperature characteristics at 55° C. or higher when compared to $LiCoO_2$, it has not yet been put to practical use in batteries.

To overcome these problems, numerous studies have focused on materials having a layered crystal structure. Under such circumstances, $Li[Ni_{1/2}Mn_{1/2}]O_2$ (nickel:manganese=1:1) and $Li[Ni_{1/3}Co_{1/3}Mn_{1/3}]O_2$ (nickel:cobalt:manganese=1:1:1), each of which has a layered crystal structure, are currently in the spotlight. These materials are advantageous over $LiCoO_2$ in terms their low price, high capacity and superior thermal stability.

However, since $Li[Ni_{1/2}Mn_{1/2}]O_2$ and $Li[Ni_{1/3}Co_{1/3}Mn_{1/3}]O_2$ have a lower electronic conductivity than $LiCoO_2$, they show poor high-rate characteristics and poor low-temperature characteristics. Further, since $Li[Ni_{1/2}Mn_{1/2}]O_2$ and $Li[Ni_{1/3}Co_{1/3}Mn_{1/3}]O_2$ have a low tap density, no improvement in the energy density of batteries is achieved despite their high capacity. Particularly, the electronic conductivity of $Li[Ni_{1/2}Mn_{1/2}]O_2$ is extremely low, which causes difficulty in the commercialization of the material (J. of Power Sources, 112 (2002) 41-48). Particularly, $Li[Ni_{1/2}Mn_{1/2}]O_2$ and $Li[Ni_{1/3}Co_{1/3}Mn_{1/3}]O_2$ show poor high-power characteristics over $LiCoO_2$ and $LiMn_2O_4$, which makes them unsuitable as materials for hybrid power sources for use in electric automobiles. In an attempt to solve such problems, Japanese Patent Laid-open No. 2003-59491 suggests a method for treating the surface of a cathode active material with conductive carbon black. However, significant improvement has not hitherto been reported.

Lithium secondary batteries have problems in that the cycle life is drastically shortened due to repeated charge-discharge cycles, especially at high temperatures. The reason for this is that electrolytes are decomposed, active materials are degraded, and the internal resistance of batteries is increased due to the presence of moisture within batteries and other factors. A number of efforts to solve these problems have been made. For example, Korean Patent No. 10-277796 discloses a cathode active material surface-coated with a metal oxide, such as an oxide of Mg, Al, Co, K, Na or Ca, by annealing. A technique for improving the energy density and high-rate characteristics of lithium secondary batteries by adding $TiO_2$ to an active material, e.g., $LiCoO_2$, is suggested (Electrochemical and Solid-State Letters, 4 (6) A65-A67 2001). A technique for prolonging the cycle life of lithium secondary batteries by treating the surface of natural graphite with aluminum is known (Electrochemical and Solid-State Letters, 4 (8) A109-A112 2001). However, the problems of the shortened cycle life and gas evolution arising from the decomposition of electrolytes during charge and discharge still remain unsolved. Further, active materials may be dissolved by acids formed from the oxidation of electrolytes during charge due to a reduction in the capacity of batteries (Journal of Electrochemical Society, 143 (1996) P2204). In recent years, Korean Patent Laid-open No. 2003-0032363 describes a technique for coating the surface of a cathode active material with a hydroxide, oxyhydroxide, oxycarbonate or hydroxycarbonate of Mg, Al, Co, K, Na, Ca, Si, Ti, Sn, V, Ge, Ga, B, As, or Zr.

SUMMARY OF THE INVENTION

Technical Problem

The present invention has been made in view of the above problems, and it is an object of the present invention to provide a cathode active material coated with a fluorine compound powder that is capable of preventing deterioration in the performance of batteries, such as cycle characteristics, particularly at high voltage and high rate by coating of nano-sized fluorine compound.

Technical Solution

In accordance with one aspect of the present invention for achieving the above object, there is provided a cathode active material for lithium secondary batteries wherein the surface of the cathode active material is coated with a fluorine compound.

In one preferred embodiment of the present invention, the fluorine compound is at least one compound selected from the group consisting of CsF, KF, LiF, NaF, RbF, TiF, AgF, AgF$_2$, BaF$_2$, CaF$_2$, CuF$_2$, CdF$_2$, FeF$_2$, HgF$_2$, Hg$_2$F$_2$, MnF$_2$, MgF$_2$, NiF$_2$, PbF$_2$, SnF$_2$, SrF$_2$, XeF$_2$, ZnF$_2$, AlF$_3$, BF$_3$, BiF$_3$, CeF$_3$, CrF$_3$, DyF$_3$, EuF$_3$, Ga$_3$F, GaF$_3$, GdF$_3$, FeF$_3$, HoF$_3$, InF$_3$, LaF$_3$, LuF$_3$, MnF$_3$, NdF$_3$, VOF$_3$, PrF$_3$, SbF$_3$, ScF$_3$, SmF$_3$, TbF$_3$, TiF$_3$, TmF$_3$, YF$_3$, YbF$_3$, TlF$_3$, CeF$_4$, GeF$_4$, HfF$_4$, SiF$_4$, SnF$_4$, TiF$_4$, VF$_4$, ZrF$_4$, NbF$_5$, SbF$_5$, TaF$_5$, BiF$_5$, MoF$_5$, ReF$_5$, SF$_5$, WF$_5$, MoF$_6$, ReF$_6$, SF$_6$, WF$_6$, and other inorganic fluorine compounds other fluorine-containing compounds.

In one embodiment of the present invention, the cathode active material coated with the fluorine compound is Li[Co$_{1-x}$M$_x$]O$_{2-a}$F$_a$ or Li[Co$_{1-x}$M$_x$]O$_{2-a}$S$_a$ (0≤a≤0.1, 0≤x≤0.1, and M is at least one metal selected from the group consisting of Mg, Al, Ni, Mn, Zn, Fe, Cr, Ga, Mo and W) having a hexagonal layered rock-salt structure.

In one embodiment of the present invention, the cathode active material coated with the fluorine compound is Li$_{1+a}$[Ni$_{1-x}$M$_x$]O$_{2-b}$F$_b$ or Li$_{1+a}$[Ni$_{1-x}$M$_x$]O$_{2-b}$S$_b$ (0.01≤a≤0.2, 0≤b≤0.1, 0.01≤x≤0.5, and M is at least one metal selected from the group consisting of Mg, Al, Co, Mn, Zn, Fe, Cr, Ga, Mo and W) having a hexagonal layered rock-salt structure.

In one embodiment of the present invention, the cathode active material coated with the fluorine compound is Li$_{1+a}$[Ni$_{1-x-y}$Co$_x$Mn$_y$]O$_{2-b}$F$_b$ or Li$_{1+a}$[Ni$_{1-x-y}$Co$_x$Mn$_y$]O$_{2-b}$S$_b$ (0.01≤a≤0.2, 0≤b≤0.1, 0.05≤x≤0.4, 0.05≤y≤0.35, and 0.1≤x+y≤0.75) having a hexagonal layered rock-salt structure.

In one embodiment of the present invention, the cathode active material coated with the fluorine compound is Li[Li$_a$(Ni$_x$Co$_{1-2x}$Mn$_x$)$_{1-a}$]O$_{2-b}$F$_b$ or Li[Li$_a$(Ni$_x$Co$_{1-2x}$Mn$_x$)$_{1-a}$]O$_2$S$_b$ (0.01≤a≤0.2, 0.05≤x≤0.5, and 0≤b≤0.1) having a hexagonal layered rock-salt structure.

In one embodiment of the present invention, the cathode active material coated with the fluorine compound is Li[Li$_a$(Ni$_x$Co$_{1-2x}$Mn$_{x-y/2}$M$_y$)$_{1-a}$]O$_{2-b}$F$_b$ or Li[Li$_a$(Ni$_x$Co$_{1-2x}$Mn$_{x-y/2}$M$_y$)$_{1-a}$]O$_{2-b}$S$_b$ (M is at least one metal selected from the group consisting of Mg, Ca, Cu and Zn, 0.01≤a≤0.2, 0.05≤x≤0.5, 0.01≤y≤0.1, and 0≤b≤0.1) having a hexagonal layered rock-salt structure.

In one embodiment of the present invention, the cathode active material coated with the fluorine compound is Li[Li$_a$(Ni$_{1/3}$Co$_{(1/3-2x)}$Mn$_{(1/3+x)}$M$_x$)$_{1-a}$]O$_{2-b}$F$_b$ or Li[Li$_a$(Ni$_{1/3}$Co$_{(1/3-2x)}$Mn$_{(1/3+x)}$M$_x$)$_{1-a}$]O$_{2-b}$S$_b$ (M is at least one metal selected from the group consisting of Mg, Ca, Cu and Zn, 0.01≤a≤0.2, 0≤x≤0.5, 0.01≤y≤0.1, and 0≤b≤0.1) having a hexagonal layered rock-salt structure.

In one embodiment of the present invention, the cathode active material coated with the fluorine compound is Li[Li$_a$(Ni$_x$Co$_{1-2x-y}$Mn$_x$M$_y$)$_{1-a}$]O$_{2-b}$F$_b$ or Li[Li$_a$(Ni$_x$Co$_{1-2x-y}$Mn$_x$M$_y$)$_{1-a}$]O$_{2-b}$S$_b$ (M is at least one metal selected from the group consisting of B, Al, Fe and Cr, 0.01≤a≤0.2, 0.05≤x≤0.5, 0.01≤y≤0.1, and 0≤b≤0.1) having a hexagonal layered rock-salt structure.

In one embodiment of the present invention, the cathode active material coated with the fluorine compound is Li[Li$_a$(Ni$_x$Co$_{1-2x-y}$Mn$_{x-z/2}$M$_y$N$_z$)]O$_{2-b}$F$_b$ or Li[Li$_a$(Ni$_x$Co$_{1-2x-y}$Mn$_{x-z/2}$M$_y$N$_z$)$_{1-a}$]O$_{2-b}$S$_b$ (M is at least one metal selected from the group consisting of B, Al, Fe and Cr, N is Mg or Ca, 0.01≤a≤0.2, 0≤x≤0.5, 0.01≤y≤0.1, and 0≤b≤0.1) having a hexagonal layered rock-salt structure.

In one embodiment of the present invention, the cathode active material coated with the fluorine compound is LiM$_x$Fe$_{1-x}$PO$_4$ (is at least one metal selected from the group consisting of Co, Ni and Mn, and 0≤x≤1) having an olivine structure.

In one embodiment of the present invention, the cathode active material coated with the fluorine compound is spinel Li$_{1+a}$[Mn$_{2-x}$M$_x$]O$_{4-b}$F$_b$ or Li$_{1+a}$[Mn$_{2-x}$M$_x$]O$_{4-b}$S$_b$ (0.01≤a≤0.15, 0≤b≤0.1, 0≤x≤0.1, and M is at least one metal selected from the group consisting of Co, Ni, Cr, Mg, Al, Zn, Mo and W) having a cubic structure.

In one embodiment of the present invention, the cathode active material coated with the fluorine compound is spinel Li$_{1+a}$[Ni$_{0.5}$Mn$_{1.5-x}$M$_x$]O$_{4-b}$F$_b$ or Li$_{1+a}$[Ni$_{0.5}$Mn$_{1.5-x}$M$_x$]O$_{4-b}$S$_b$ (0.01≤a≤0.15, 0≤b≤0.1, 0≤x≤0.1, and M is at least one metal selected from the group consisting of Co, Ni, Cr, Mg, Al, Zn, Mo and W) having a cubic structure.

In accordance with another aspect of the present invention, there is provided a preferred method for preparing a cathode active material coated with a fluorine compound for lithium secondary batteries, the method comprising mixing a fluorine (F) compound with an elemental precursor in an aqueous solution to obtain a fluorine compound powder with a high degree of dispersion therein, adding a solution of a cathode active material for lithium secondary batteries to the aqueous solution, and reacting the mixed solution at 50-100° C. for 3-48 hours.

In accordance with yet another aspect of the present invention, there is provided a method for preparing a cathode active material coated with a fluorine compound for lithium secondary batteries, the method comprising mixing a cathode active material for lithium secondary batteries with 0.1-10% by weight of an elemental precursor, relative to the weight of the cathode active material, in an aqueous solution, adding a solution of a fluorine (F) compound to the aqueous solution, and reacting the mixed solution at 50-100° C. for 3-48 hours.

In one preferred embodiment, the methods of the present invention further comprise drying the resultant reaction product at 110° C. for 6-24 hours, followed by annealing the dried resultant in an oxidizing or reducing atmosphere or under vacuum at 150-900° C. for 1-20 hours to produce a fluorine compound powder-coated cathode active material.

In one preferred embodiment of the present invention, the elemental precursor is an alkoxide, sulfate, nitrate, acetate, chloride or phosphate of at least one element selected from the group consisting of Cs, K, Li, Na, Rb, Ti, Ag (I), Ag (II), Ba, Ca, Cu, Cd, Fe, Hg (II), Hg (I), Mn (II), Mg, Ni, Pb, Sn, Sr, Xe, Zn, Al, B, Bi (III), Ce (III), Cr, Dy, Eu, Ga, Gd, Fe, Ho, In, La, Lu, Mn (III), Nd, VO, Pr, Sb (III), Sc, Sm, Th, Ti (III), Tm, Y, Yb, Tl, Ce (IV), Ge, Hf, Si, Sn, Ti (IV), V, Zr, Nb, Sb (V), Ta, Bi (V), Mo, Re, S, and W.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 1:
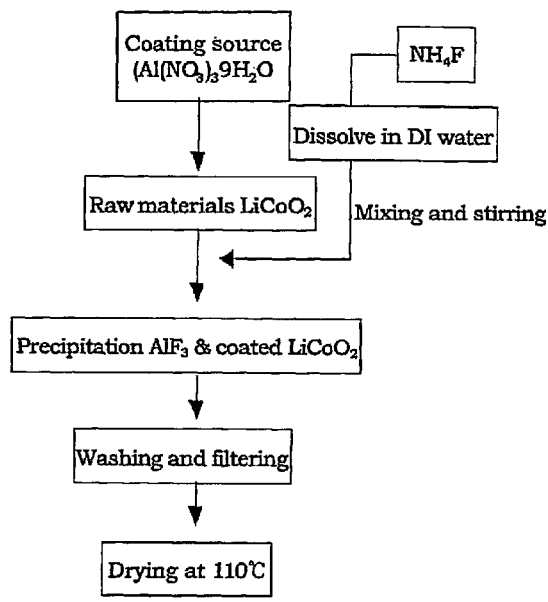
FIG. 1 is a flow chart illustrating the procedure of a method for coating a cathode active material in Example 1 of the present invention.

Hereinafter, the present invention will be described in greater detail.

The present invention provides a cathode active material coated with a fluorine compound powder that is capable of preventing deterioration in the performance of lithium secondary batteries, such as cycle characteristics, particularly at high temperature and high rate.

The fluorine compound coated on the surface of the cathode active material may be at least one compound selected from the group consisting of CsF, KF, LiF, NaF, RbF, TiF, AgF, AgF$_2$, BaF$_2$, CaF$_2$, CuF$_2$, CdF$_2$, FeF$_2$, HgF$_2$, Hg$_2$F$_2$, MnF$_2$, MgF$_2$, NiF$_2$, PbF$_2$, SnF$_2$, SrF$_2$, XeF$_2$, ZnF$_2$, AlF$_3$, BF$_3$, BiF$_3$, CeF$_3$, CrF$_3$, DyF$_3$, EuF$_3$, GaF$_3$, GdF$_3$, FeF$_3$, HoF$_3$, InF$_3$, LaF$_3$, LuF$_3$, MnF$_3$, NdF$_3$, VOF$_3$, PrF$_3$, SbF$_3$, ScF$_3$, SmF$_3$, TbF$_3$, TiF$_3$, TmF$_3$, YF$_3$, YbF$_3$, TIF$_3$, CeF$_4$, GeF$_4$, HfF$_4$, SiF$_4$, SnF$_4$, TiF$_4$, VF$_4$, ZrF$_4$, NbF$_5$, SbF$_5$, TaF$_5$, BiF$_5$, MoF$_5$, ReF$_5$, SF$_5$, WF$_5$, MoF$_6$, ReF$_6$, SF$_6$, WF$_6$, and other inorganic fluorine compounds other fluorine-containing compounds.

The coating with the fluorine compound reduces the influence of acids formed in the vicinity of the cathode active material and inhibits the reactivity between the cathode active material and an electrolyte so that a drastic reduction in the capacity of batteries can be prevented, thereby improving the charge-discharge characteristics, cycle characteristics, high-voltage and high-rate characteristics, and thermal stability of the final cathode active material for batteries.

The surface of the cathode active material to be coated with the fluorine compound is amorphous, crystalline, or a mixed state thereof.

The present invention also provides a preferred method for preparing a cathode active material coated with a fluorine compound for lithium secondary batteries, the method comprising the steps of mixing a fluorine (F) compound with an elemental precursor in an aqueous solution to obtain a fluorine compound powder with a high degree of dispersion therein, adding a solution of a cathode active material for lithium secondary batteries to the aqueous solution, and reacting the mixed solution at 50-100° C. for 3-48 hours to coat the cathode active material with the fluorine compound.

The reason for the high co-precipitation reaction temperature is that the co-precipitation of the elemental precursor enables the formation of a precipitate with a high degree of dispersion in a complex state.

The fluorine compound powder with a high degree of dispersion is obtained after a certain time of the mixing of the fluorine (F) compound with the elemental precursor. Since the coating is carried out after the formation of the fluorine compound powder with a high degree of dispersion, the necessity of controlling the precipitation rate is avoided when the fluorine (F) compound is added. In addition, since the fluorine compound is previously obtained by mixing the fluorine (F) compound and the elemental precursor, the amount of a solvent used, e.g., an alcohol, which is a more expensive reagent than distilled water, can be reduced, thus reducing the coating cost.

Specifically, the cathode active material coated with the fluorine compound is prepared in accordance with the following procedure. First, at least one elemental precursor selected from Cs, K, Li, Na, Rb, Ti, Ag (I), Ag (II), Ba, Ca, Cu, Cd, Fe, Hg (II), Hg (I), Mn (II), Mg, Ni, Pb, Sn, Sr, Xe, Zn, Al, B, Bi (III), Ce (III), Cr, Dy, Eu, Ga, Gd, Fe, Ho, In, La, Lu, Mn (III), Nd, VO, Pr, Sb (III), Sc, Sm, Tb, Ti (III), Tm, Y, Yb, TI, Ce (IV), Ge, Hf, Si, Sn, Ti (IV), V, Zr, Nb, Sb (V), Ta, Bi (V), Mo, Re, S and W is dissolved in an alcohol, such as a monohydric (e.g., methanol, ethanol or isopropanol) or dihydric alcohol (e.g., ethylene glycol or butyl glycol), or distilled water. A fluorine (F)-containing solution is added to the solution to obtain a metal fluoride compound powder. Thereafter, a cathode active material for lithium secondary batteries is added to the mixed solution so that it is coated with the metal fluoride compound.

The amount of the fluorine (F)-containing solution used is preferably in the range of 1 to 20 moles, relative to one mole of the coating element. As the elemental precursor, there can be used an alkoxide, such as methoxide, ethoxide, isopropoxide or butoxide, sulfate, nitrate, acetate, chloride, or oxide. The amount of the coating element used is desirably in the range of 0.1 to 10% by weight, relative to the weight of the cathode active material. If the coating element is used in an amount of less than 0.1% by weight, coating effects are not exhibited. Meanwhile, if the coating element is used in an amount exceeding 10% by weight, the excessive weight of the coating element causes a reduction in the capacity and energy density of batteries. The mixed solution containing the cathode active material for lithium secondary batteries and the fluorine compound is reacted at 50-150° C. for 3-48 hours.

In another aspect, the present invention also provides a method for preparing a cathode active material coated with a fluorine compound for lithium secondary batteries, comprising mixing a cathode active material for lithium secondary batteries with 0.1-10% by weight of an elemental precursor, relative to the weight of the cathode active material, in an aqueous solution, adding a solution of a fluorine (F) compound to the aqueous solution, and reacting the mixed solution at 50-100° C. for 3-48 hours to coat the cathode active material with the fluorine compound.

According to the previous method, the fluorine compound powder obtained from the mixture of the fluorine (F) compound and the elemental precursor may not have a high degree of dispersion in view of the characteristics of the elemental precursor and has a strong tendency to aggregate so that it has a large size. As a result, an improvement in characteristics may not be expected. Accordingly, it is desirable to control the precipitation rate so that the fluorine compound is slowly formed, and at the same time, it is coated on the surface of the cathode active material.

Specifically, the cathode active material coated with the fluorine compound is prepared in accordance with the following procedure. First, at least one elemental precursor selected from Cs, K, Li, Na, Rb, Ti, Ag (I), Ag (II), Ba, Ca, Cu, Cd, Fe, Hg (II), Hg (I), Mn (II), Mg, Ni, Pb, Sn, Sr, Xe, Zn, Al, B, Bi (III), Ce (III), Cr, Dy, Eu, Ga, Gd, Fe, Ho, In, La, Lu, Mn (I), Nd, VO, Pr, Sb (III), Sc, Sm, Th, Ti (III), Tm, Y, Yb, TI, Ce (IV), Ge, Hf, Si, Sn, Ti (IV), V, Zr, Nb, Sb (V), Ta, Bi (V), Mo, Re, S and W is dissolved in an alcohol, such as a monohydric (e.g., methanol, ethanol or isopropanol) or dihydric alcohol (e.g., ethylene glycol or butyl glycol), or distilled water. A cathode active material for lithium secondary batteries is added to the solution. Thereafter, to the mixed solution is added a fluorine (F)-containing solution so that the cathode active material for lithium secondary batteries is coated with the metal fluoride compound.

The amount of the fluorine (F)-containing solution used is preferably in the range of 1 to 20 moles, relative to one mole of the coating element. As the metal salt, there can be used an alkoxide, such as methoxide, ethoxide, isopropoxide or butoxide, sulfate, nitrate, acetate, chloride, or oxide. The amount of the coating element used is desirably in the range of 0.1 to 10% by weight, relative to the weight of the cathode active material. If the coating element is used in an amount of less than 0.1% by weight, coating effects are not exhibited. Meanwhile, if the coating element is used in an amount exceeding 10% by weight, the excessive weight of the coating element causes a reduction in the capacity and energy density of batteries. The mixed solution containing the cathode active material for lithium secondary batteries and the fluorine compound is reacted at 50-150° C. for 3-48 hours.

The methods of the present invention may further comprise drying the coated cathode active material at 110° C. for 6-24 hours, followed by annealing in an oxidizing or reducing atmosphere or under vacuum at 150-900° C. for 1-20 hours. The annealing serves to remove remaining impurities to obtain the fluorine compound in a desired form and to enhance the binding force of the fluorine compound powder coated on the surface of the cathode active material.

MODE FOR THE INVENTION

The present invention will now be described in more detail with reference to the following examples. However, these examples are not to be construed as limiting the scope of the invention.

Example 1

1. Preparation of $AlF_3$-Coated $LiCoO_2$ 2 mol % of $Al(NO_3)_3.9H_2O$ was dissolved in 150 ml of distilled water in a 500-ml beaker, and then a commercially available $LiCoO_2$ active material was contained therein. The mixture was stirred. Separately, 150 ml of a solution of $NH_4F$ (6 mol %) was continuously added to the previous solution at a flow rate of 1 ml/min while maintaining the temperature of the reactor at 80° C. The mixed solution was subjected to co-precipitation, followed by stirring for 24 hours. At this time, the average temperature of the reactor was maintained at 80° C. The reason for the high co-precipitation reaction temperature is that the co-precipitation of $AlF_3$ enables the formation of a precipitate with a high degree of dispersion in a complex state. The $LiCoO_2$ coated with the fluorine compound was washed with distilled water, dried in a hot-air thermostat at 110° C. for 12 hours, and annealed in an inert atmosphere at 400° C., giving the final $AlF_3$-coated $LiCoO_2$.

2. Evaluation of Characteristics of $AlF_3$-Coated $LiCoO_2$ i) XRD

Figure 2:
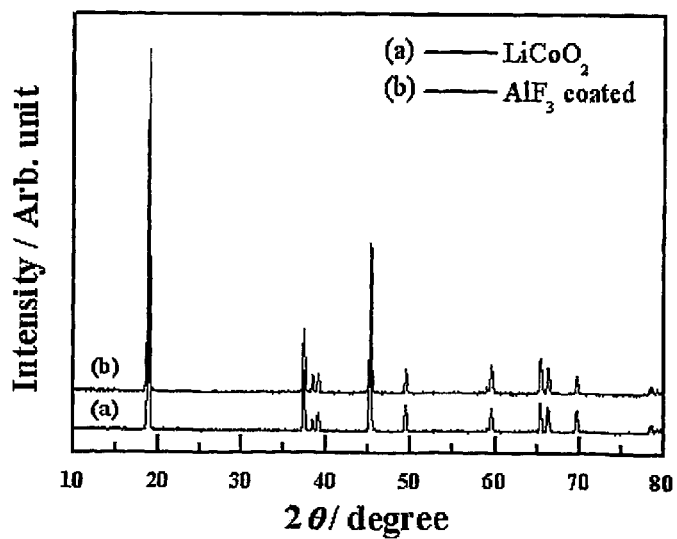
FIG. 2 shows X-ray diffraction (XRD) patterns of a cathode active material prepared in Example 1 and a cathode active material used in Comparative Example 1 of the present invention.

An X-ray diffraction pattern of the $AlF_3$-coated $LiCoO_2$ was obtained using an X-ray diffraction analyzer (Rint-2000, Rigaku, Japan). The pattern is shown in FIG. 2.

ii) Scanning Electron Microscopy (SEM)

Figure 3:
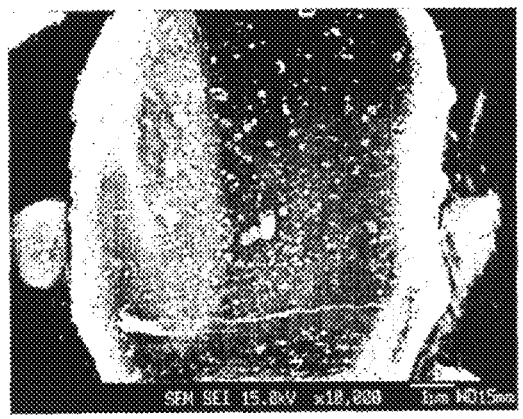
FIG. 3 is a field emission scanning electron microscopy (FESEM) image of a cathode active material prepared in Example 1 of the present invention.

An image of the $AlF_3$-coated $LiCoO_2$ prepared in Example 1 was obtained using a SEM (ISM 6400, JEOL, Japan), and the image is shown in FIG. 3.

iii) Energy Dispersive Spectroscopy (EDS)

Figure 5:
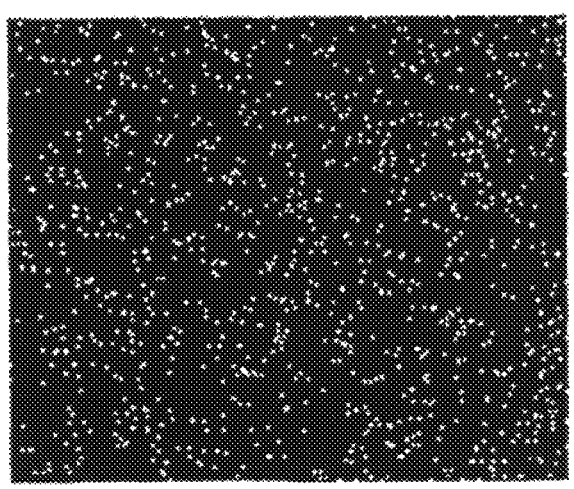
FIGS. 5 and 6 are images showing the results of a cathode active material prepared in Example 1 of the present invention by energy dispersive spectroscopy (EDS)
Figure 6:
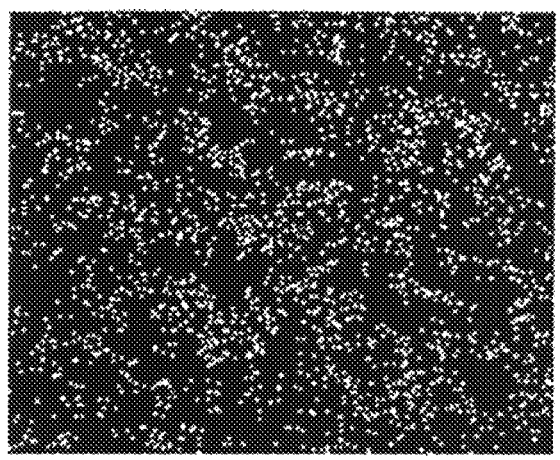

An image of the $AlF_3$-coated $LiCoO_2$ prepared in Example 1 was obtained using an EDS (JSM 6400, JEOL, Japan), and the image is shown in FIG. 5. The image indicates uniform distribution of Al and F.

3. Production of Cathode 20 mg of the $AlF_3$-coated $LiCoO_2$, 8 mg of teflonized acetylene black and 4 mg of graphite were homogeneously mixed. The mixture was uniformly pressed under a load of 1 ton using a stainless steel Ex-met, and dried at 100° C. to produce a cathode for lithium secondary batteries.

4. Fabrication of Coin Cell

A 2032 coin cell was fabricated by using the cathode, a lithium foil as a counter electrode, a porous polyethylene film (thickness: 25 □, Celgard 2300, Celgard LLC) as a separator, and a 1M $LIPF_6$ solution in a mixed solvent of ethylene carbonate and dimethyl carbonate (1:1 (v/v)) as a liquid electrolyte in accordance with procedures well known in the art.

Figure 7:
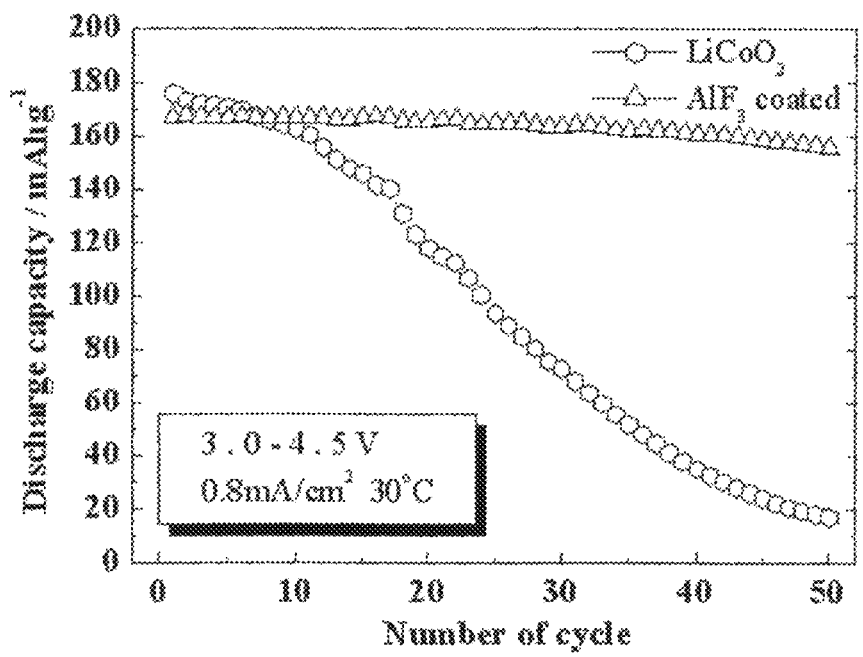
FIG. 7 is a graph showing discharge capacity versus number of cycles of half-cells using a cathode active material prepared in Example 1 and a cathode active material used in Comparative Example 1 of the present invention in the voltage range of 3.0-4.5V at room temperature (30° C.) and a constant current density of 0.8 mA/cm$^2$.
Figure 8:
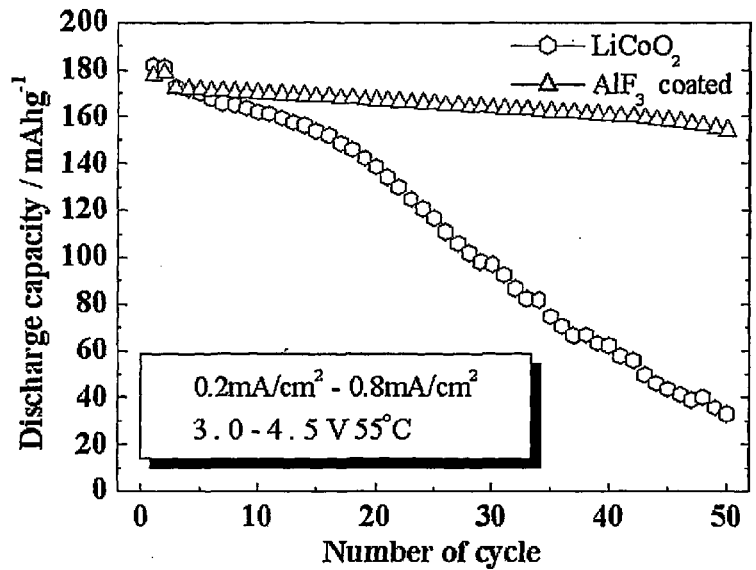
FIG. 8 is a graph showing discharge capacity versus number of cycles of half-cells using a cathode active material prepared in Example 1 and a cathode active material used in Comparative Example 1 of the present invention in the voltage range of 3.0-4.5V at a high temperature (55° C.) and a constant current density of 0.8 mA/cm$^2$.
Figure 9:
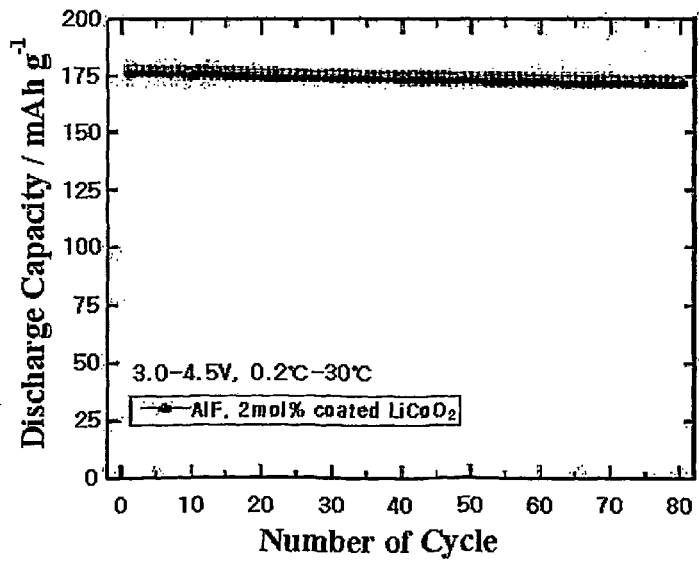
FIG. 9 is a graph showing discharge capacity versus number of cycles of half-cells using a cathode active material prepared in Example 1 and a cathode active material used in Comparative Example 1 of the present invention in the voltage range of 3.0-4.5V at room temperature (30° C.) and a constant current density of 0.2 mA/cm$^2$.

To evaluate the characteristics of the coin cell, charge-discharge tests were conducted at room temperature (30° C.) and a current density of 0.8 mA/cm$^2$ (FIG. 7), at a high temperature (55° C.) and a current density of 0.8 mA/cm$^2$ (FIG. 8), and at room temperature (30° C.) and a constant current density of 0.2 mA/cm$^2$ (FIG. 9) in the voltage range of 3.0-4.5V using an electrochemical analysis system (Toscat3000U, Toyo, Japan). Changes in discharge capacity with increasing number of cycles are shown in FIGS. 7 to 9. After 50 cycles of discharging and recharging, the $AlF_3$-coated $LiCoO_2$ showed a capacity retention of 93% at 0.8 mA/cm$^2$ at room temperature (30° C.), a capacity retention of 99% at 0.2 mA/cm$^2$ at room temperature (30° C.), and a capacity retention of 90% at 0.8 mA/cm$^2$ at a high temperature of 55° C. These results demonstrate that there is little or no decrease in capacity retention with increasing number of cycles.

Figure 10:
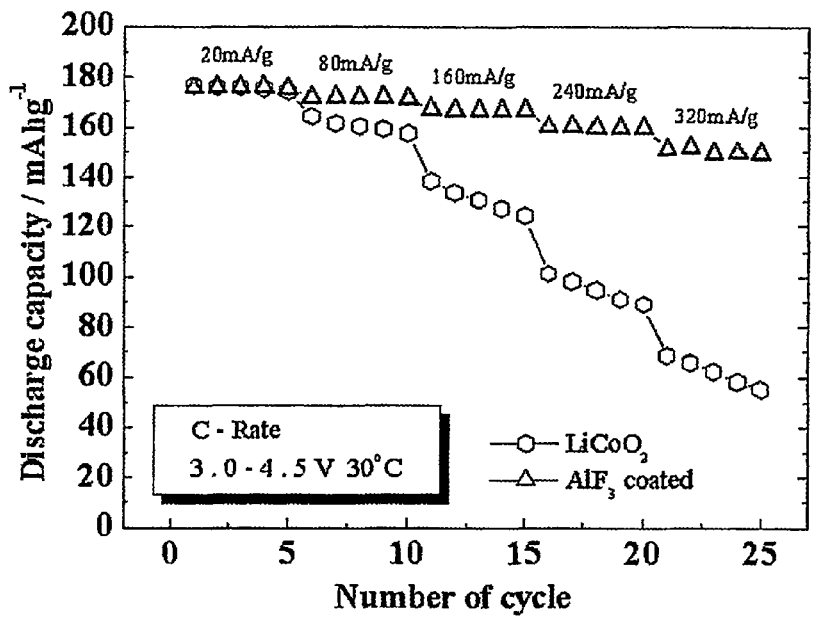
FIG. 10 is a graph showing discharge capacity versus number of cycles of half-cells using a cathode active material prepared in Example 1 and a cathode active material used in Comparative Example 1 of the present invention according to C-rates in the voltage range of 3.0-4.5V at room temperature (30° C.)
Figure 11:
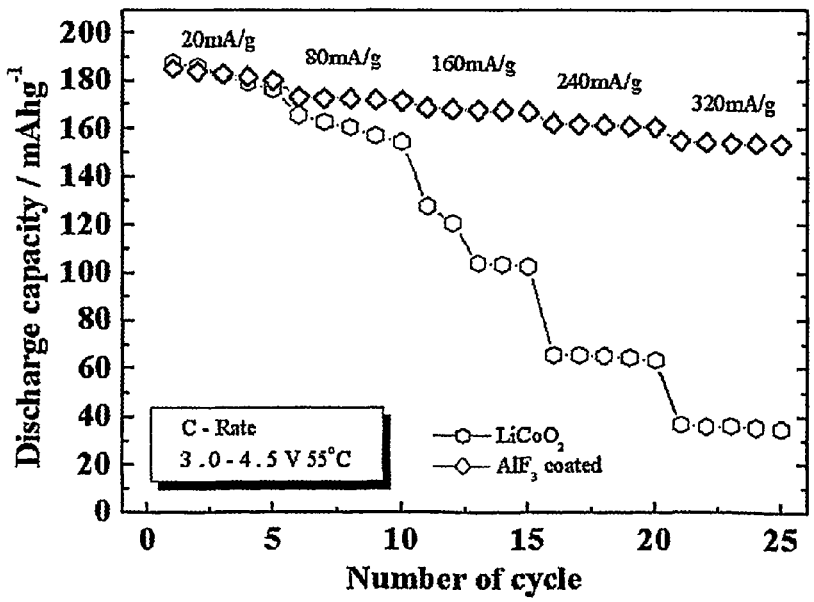
FIG. 11 is a graph showing discharge capacity versus number of cycles of half-cells using a cathode active material prepared in Example 1 and a cathode active material used in Comparative Example 1 of the present invention according to C-rates in the voltage range of 3.0-4.5V at a high temperature (55° C.)

To evaluate the high-rate characteristics of the cell, charge-discharge tests were conducted at room temperature (30° C.) (FIG. 10) and at a high temperature (55° C.) (FIG. 11) in the voltage range of 3.0-4.5V under various current density conditions using an electrochemical analysis system (Toscat3000U, Toyo, Japan). Changes in discharge capacity with increasing number of cycles are shown in FIGS. 10 and 11. The graphs demonstrate that the $AlF_3$-coated $LiCoO_2$ shows superior high-rate characteristics both at room temperature (30° C.) and a high temperature (55° C.) under various current density conditions, compared to $LiCoO_2$.

To evaluate the Co dissolution of the $AlF_3$-coated $LiCoO_2$, after three cycles of charging and recharging in the potential range of 3.0-4.5V at a high temperature (60° C.), the coin cell was charged to 4.5V at the 4-th cycle. Thereafter, the cell was disassembled to separate the cathode. The cathode was immersed in an electrolyte and stored in a thermostat at 60° C. Changes in the Co concentration in the electrolyte were analyzed with the passage of time using an atomic absorption spectroscopy (AAS) (Varion6, Analytik-jena, Germany). The analytical results of the Co dissolution are shown in FIG. 8. For the AAS analysis, a Co standard solution (1,000 ppm, AnApex Co. Ltd. Korea) was diluted to 100 ppm and 10 ppm sequentially to optimize the concentrations (ppm). Using the optimized concentrations, a calibration curve was plotted. As a result, the calibration curve had a confidence level of 99.99%. Co was dissolved at 86.925 ppm from $LiCoO_2$ within the electrolyte after 336 hours, whereas Co was dissolved at 23.275 ppm from the $AlF_3$-coated $LiCoO_2$ within the electrolyte after 336 hours. From these results, it is apparent that the coating with $AlF_3$ considerably decreases the Co dissolution.

Example 2

Preparation of $ZnF_2$-Coated $LiCoO_2$ 2 mol % of $ZN(NO_3)_3.H_2O$ was dissolved in 150 ml of distilled water in a 500-ml beaker, and then a commercially available $LiCoO_2$ active material was contained therein. The mixture was stirred. Separately, 150 ml of a solution of $NH_4F$ (4 mol %) was continuously added to the previous solution at a flow rate of 1 ml/min while maintaining the temperature of the reactor at 80° C. The mixed solution was subjected to co-precipitation, followed by stirring for 24 hours. At this time, the average temperature of the reactor was maintained at about 80° C. The reason for the high co-precipitation reaction temperature is that the co-precipitation of $ZnF_2$ enables the formation of a precipitate with a high degree of dispersion in a complex state. The $LiCoO_2$ coated with the fluorine compound was washed with distilled water, dried in a hot-air thermostat at 110° C. for 12 hours, and annealed in an inert atmosphere at 400° C., giving the final $ZnF_2$-coated $LiCoO_2$.

2. XRD Evaluation of $ZnF_2$-Coated $LiCoO_2$

Figure 13:
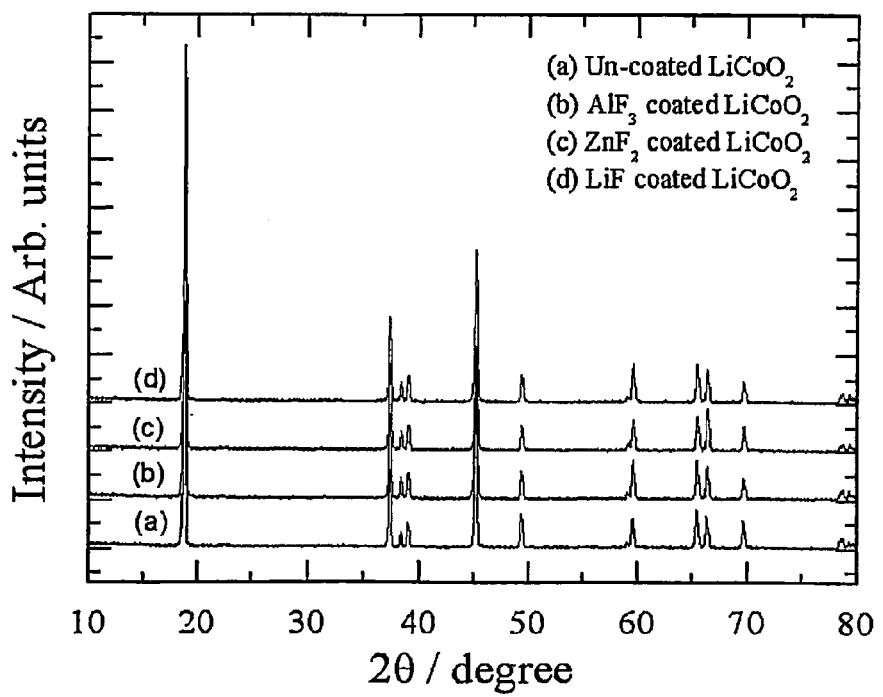
FIG. 13 shows XRD patterns of cathode active materials prepared in Examples 1 to 3 and a cathode active material used in Comparative Example 1 of the present invention.

An X-ray diffraction pattern of the $ZnF_2$-coated $LiCoO_2$ was obtained using an X-ray diffraction analyzer. The pattern is shown in FIG. 13.

3. Fabrication of Coin Cell and Evaluation of Characteristics

A cathode was produced using the $ZnF_2$-coated $LiCoO_2$, and a coin cell comprising the cathode was fabricated in accordance with the procedure of Example 1.

To evaluate the characteristics of the coin cell, a charge-discharge test was conducted at 30° C. and a current density of 0.2 mA/cm$^2$ in the voltage range of 3.0-4.5V using an electrochemical analysis system (Toscat3000U, Toyo, Japan). Changes in discharge capacity with increasing number of cycles are shown in FIG. 13. The graph shows that there is a slight decrease in the discharge capacity of the coin cell with increasing number of cycles, indicating superior cycle characteristics.

Example 3

Preparation of LiF-Coated $LiCoO_2$ 2 mol % of $LiNO_3$ was dissolved in 150 ml of distilled water in a 500-ml beaker, and then a commercially available $LiCoO_2$ active material was contained therein. The mixture was stirred. Separately, 150 ml of a solution of $NH_4F$ (2 mol %) was continuously added to the previous solution at a flow rate of 1 ml/min while maintaining the temperature of the reactor at 80° C. The mixed solution was subjected to co-precipitation, followed by stirring for 24 hours. At this time, the average temperature of the reactor was maintained at about 80° C. The reason for the high co-precipitation reaction temperature is that the co-precipitation of LiF enables the formation of a precipitate with a high degree of dispersion in a complex state. The $LiCoO_2$ coated with the fluorine compound was washed with distilled water, dried in a hot-air thermostat at 110° C. for 12 hours, and annealed in an inert atmosphere at 400° C., giving the final LiF-coated $LiCoO_2$.

2. XRD Evaluation of LiF-Coated $LiCoO_2$

An X-ray diffraction pattern of the LiF-coated $LiCoO_2$ was obtained using an X-ray diffraction analyzer. The pattern is shown in FIG. 13.

3. Fabrication of Coin Cell and Evaluation of Characteristics

Figure 14:
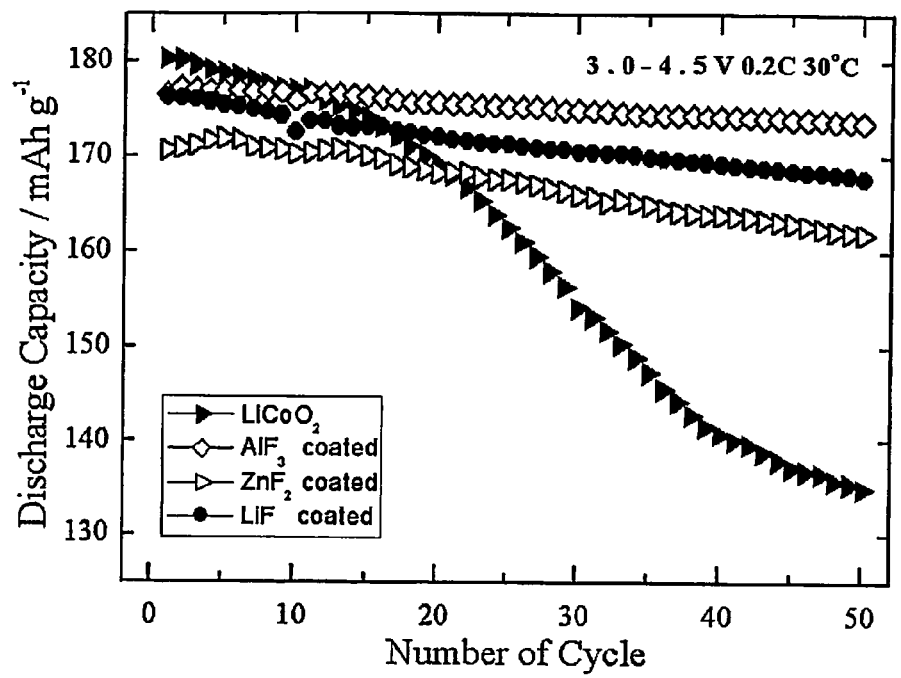
FIG. 14 is a graph showing discharge capacity versus number of cycles of half-cells using cathode active materials prepared in Examples 1 to 3 and a cathode active material used in Comparative Example 1 of the present invention in the voltage range of 3.0-4.5V at 30° C. and a constant current density of 0.2 mA/cm$^2$.

A cathode was produced using the LiF-coated $LiCoO_2$, and a coin cell comprising the cathode was fabricated. To evaluate the characteristics of the coin cell, a charge-discharge test was conducted using an electrochemical analysis system (Toscat3000U, Toyo, Japan) at 30° C. and a current density of 0.2 mA/cm$^2$ in the voltage range of 3.0-4.5V. Changes in discharge capacity with increasing number of cycles are shown in FIG. 14. The graph shows that there is a slight decrease in the discharge capacity of the coin cell with increasing number of cycles, indicating superior cycle characteristics.

Example 4

Figure 16:
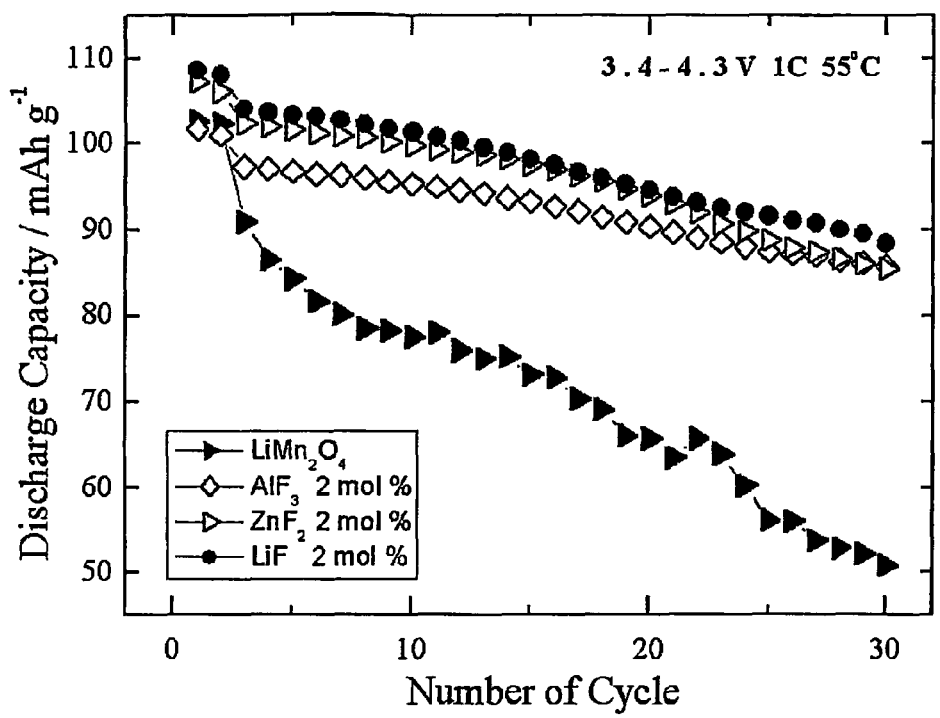
FIG. 16 is a graph showing discharge capacity versus number of cycles of half-cells using cathode active materials prepared in Examples 4 to 6 and a cathode active material used in Comparative Example 2 of the present invention in the voltage range of 3.4-4.3V at 55° C. and a constant current density of 1.1 mA/cm$^2$ (1 C)

AlF$_3$-coated LiMn$_2$O$_4$ was prepared, the characteristics of the AlF$_3$-coated LiMn$_2$O$_4$ were evaluated, and a cell comprising the AlF$_3$-coated LiMn$_2$O$_4$ was fabricated in accordance with the procedure of Example 1. To evaluate the characteristics of the coin cell, a charge-discharge test was conducted using an electrochemical analysis system (Toscat3000U, Toyo, Japan) at 55° C. and a current density of 1.1 mA/cm$^2$ (1 C) in the voltage range of 3.4-4.3V. Changes in discharge capacity with increasing number of cycles are shown in FIG. 16. The graph shows that there is a slight decrease in the discharge capacity of the coin cell with increasing number of cycles, indicating superior cycle characteristics.

Example 5

ZnF$_2$-coated LiMn$_2$O was prepared, the characteristics of the ZnF$_2$-coated LiMn$_2$O were evaluated, and a cell comprising the ZnF$_2$-coated LiMn$_2$O was fabricated in accordance with the procedure of Example 1. To evaluate the characteristics of the coin cell, a charge-discharge test was conducted using an electrochemical analysis system (Toscat3000U, Toyo, Japan) at 55° C. and a current density of 1.1 mA/cm$^2$ (1 C) in the voltage range of 3.4-4.3V. Changes in discharge capacity with increasing number of cycles are shown in FIG. 16. The graph shows that there is a slight decrease in the discharge capacity of the coin cell with increasing number of cycles, indicating superior cycle characteristics.

Example 6

LiF-coated LiMn$_2$O$_4$ was prepared, the characteristics of the LiF-coated LiMn$_2$O$_4$ were evaluated, and a cell comprising the LiF-coated LiMn$_2$O$_4$ was fabricated in accordance with the procedure of Example 1. To evaluate the characteristics of the coin cell, a charge-discharge test was conducted using an electrochemical analysis system (Toscat3000U, Toyo, Japan) at 55° C. and a current density of 1.1 mA/cm$^2$ (1 C) in the voltage range of 3.4-4.3V. Changes in discharge capacity with increasing number of cycles are shown in FIG. 16. The graph shows that there is a slight decrease in the discharge capacity of the coin cell with increasing number of cycles, indicating superior cycle characteristics.

Example 7

Figure 17:
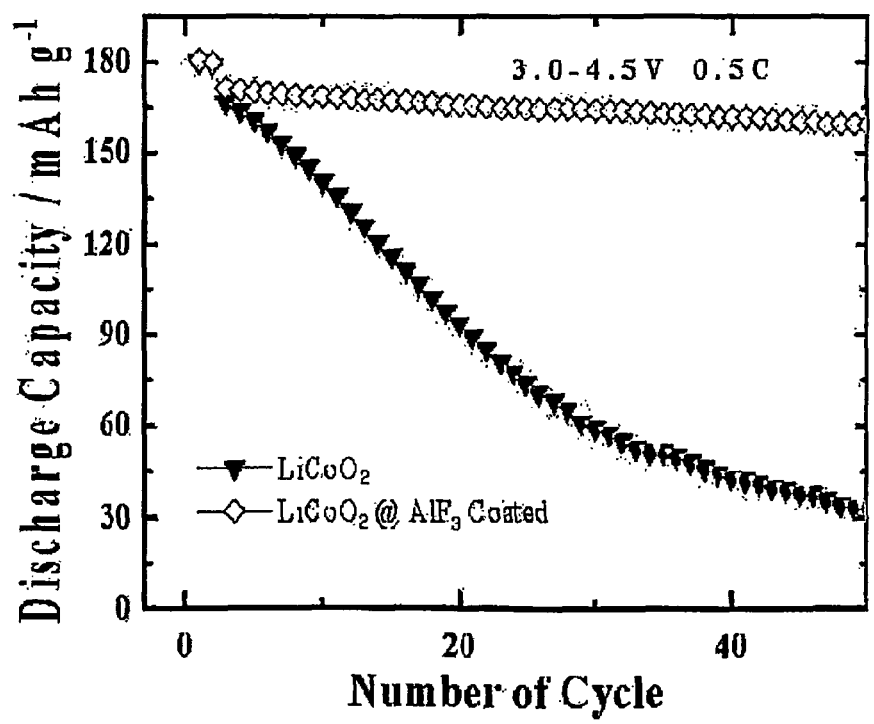
FIG. 17 is a graph showing discharge capacity versus number of cycles of half-cells using a cathode active material prepared in Example 7 and a cathode active material used in Comparative Example 1 of the present invention in the voltage range of 3.0-4.5V at 30° C. and a constant current density of 0.8 mA/cm$^2$.

2 kg of AlF$_3$-coated LiCoO$_2$ was prepared in a 70-L reactor in the same manner as in Example 1. The characteristics of the AlF$_3$-coated LiCoO$_2$ were evaluated, and a cell comprising the AlF$_3$-coated LiCoO$_2$ was fabricated in accordance with the procedure of Example 1. To evaluate the characteristics of the coin cell, a charge-discharge test was conducted using an electrochemical analysis system (Toscat3000U, Toyo, Japan) at 30° C. and a current density of 0.8 mA/cm$^2$ (1 C) in the voltage range of 3.0-4.5V. Changes in discharge capacity with increasing number of cycles are shown in FIG. 17. The graph shows that there is a slight decrease in the discharge capacity of the coin cell with increasing number of cycles, indicating superior cycle characteristics. The cell comprising the AlF$_3$-coated LiCoO$_2$ prepared in a larger amount (2 kg) in Example 7 exhibited the same effects as that comprising the AlF$_3$-coated LiCoO$_2$ prepared in a smaller amount in Example 1.

Comparative Example 1

Figure 4:
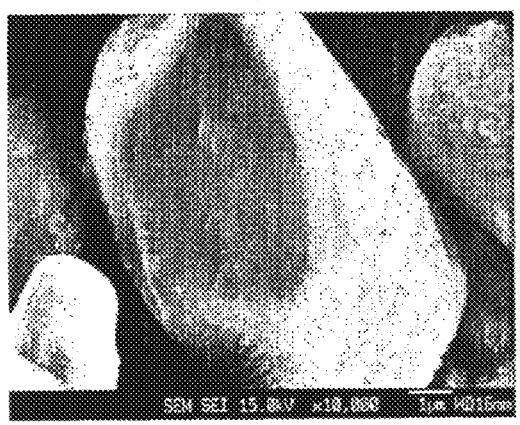
FIG. 4 is a field emission scanning electron microscopy (FESEM) image of a cathode active material used in Comparative Example 1 of the present invention.
Figure 12:
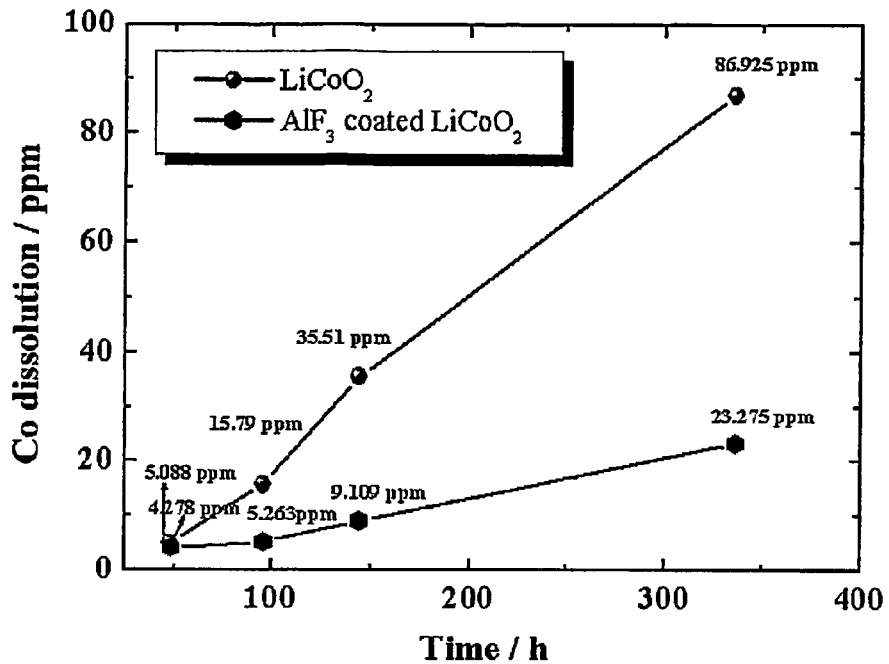
FIG. 12 is a graph showing the Co dissolution rate of a cathode active material prepared in Example 1 and a cathode active material used in Comparative Example 1 of the present invention as a function of time.

The characteristics of a commercially available uncoated LiCoO$_2$ cathode active material were evaluated by the procedure of Example 1. FIG. 2 shows XRD patterns of the cathode active material prepared in Example 1 and the cathode active material used in Comparative Example 1. FIG. 4 is a FESEM image of the cathode active material used in Comparative Example 1. FIG. 7 is a graph showing discharge capacity versus number of cycles of the half-cells using the cathode active material prepared in Example 1 and the cathode active material used in Comparative Example 1 in the voltage range of 3.0-4.5V at room temperature (30° C.) and a constant current density of 0.8 mA/cm$^2$. FIG. 8 is a graph showing discharge capacity versus number of cycles of the half-cells using the cathode active material prepared in Example 1 and the cathode active material used in Comparative Example 1 in the voltage range of 3.0-4.5V at a high temperature (55° C.) and a constant current density of 0.8 mA/cm$^2$. FIG. 9 is a graph showing discharge capacity versus number of cycles of the half-cells using the cathode active material prepared in Example 1 and the cathode active material used in Comparative Example 1 in the voltage range of 3.0-4.5V at room temperature (30° C.) and a constant current density of 0.2 mA/cm$^2$. FIG. 10 is a graph showing discharge capacity versus number of cycles of the half-cells using the cathode active material prepared in Example 1 and the cathode active material used in Comparative Example 1 according to C-rates in the voltage range of 3.0-4.5V at room temperature (30° C.). FIG. 11 is a graph showing discharge capacity versus number of cycles of the half-cells using the cathode active material prepared in Example 1 and the cathode active material used in Comparative Example 1 according to C-rates in the voltage range of 3.0-4.5V at a high temperature (55° C.). FIG. 12 is a graph showing the Co dissolution rate of the cathode active material prepared in Example 1 and the cathode active material used in Comparative Example 1 as a function of time. FIG. 13 shows XRD patterns of the cathode active materials prepared in Examples 1 to 3 and the cathode active material used in Comparative Example 1. FIG. 14 is a graph showing discharge capacity versus number of cycles of the half-cells using the cathode active materials prepared in Examples 1 to 3 and the cathode active material used in Comparative Example 1 in the voltage range of 3.0-4.5V at 30° C. and a constant current density of 0.2 mA/cm$^2$.

Comparative Example 2

Figure 15:
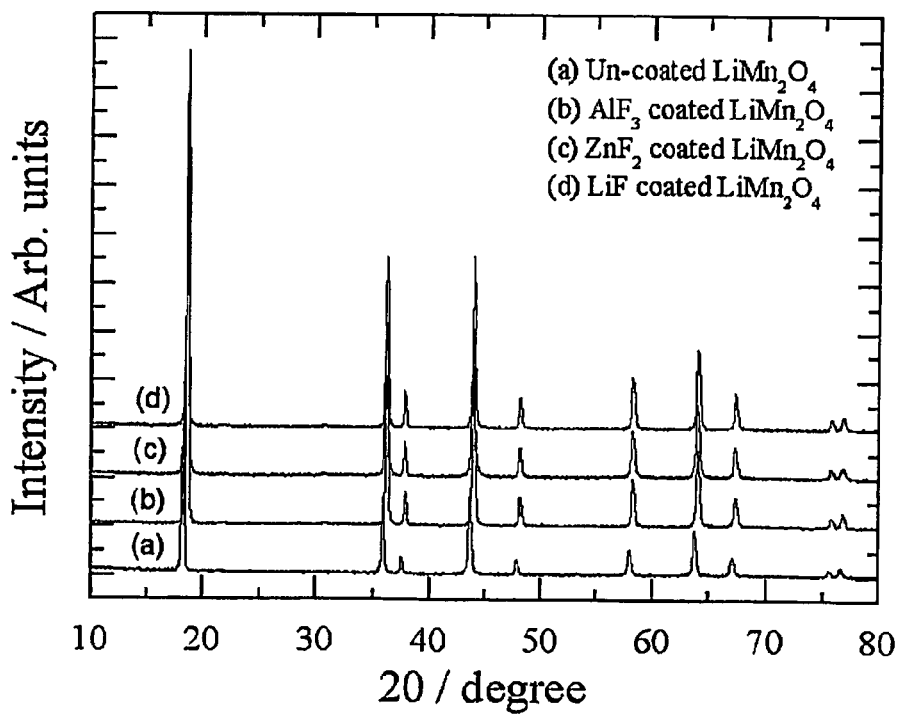
FIG. 15 shows XRD patterns of cathode active materials prepared in Examples 4 to 6 and a cathode active material used in Comparative Example 2 of the present invention.

The characteristics of a commercially available uncoated LiMn$_2$O$_4$ cathode active material were evaluated by the procedure of Example 1. FIG. 15 shows XRD patterns of the cathode active materials prepared in Examples 4 to 6 and the cathode active material used in Comparative Example 2. FIG. 16 is a graph showing discharge capacity versus number of cycles of the half-cells using the cathode active materials prepared in Examples 4 to 6 and the cathode active material used in Comparative Example 2 in the voltage range of 3.4-4.3V at 55° C. and a constant current density of 1.1 mA/cm$^2$ (1 C).

INDUSTRIAL APPLICABILITY

The coating of a cathode active material for lithium secondary batteries with a fluorine compound reduces the influence of acids formed in the vicinity of the cathode active material and inhibits the reactivity between the cathode active material and an electrolyte so that a drastic reduction in the capacity of batteries can be prevented, thereby improving the charge-discharge characteristics, cycle characteristics, high-voltage and high-rate characteristics, and thermal stability of the final cathode active material for batteries.

The invention claimed is:

1. A cathode active material for lithium secondary batteries wherein a surface of the cathode active material is coated with a fluorine compound powder, the coated surface of the cathode active material having a powdery form structure, wherein the fluorine compound is at least one compound selected from the group consisting of CsF, KF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_5$, $ReF_5$, $SF_5$, $WF_5$, $MoF_6$, $ReF_6$, $SF_6$, and $WF_6$.

2. The cathode active material of claim 1, wherein:

the cathode active material coated has a hexagonal rock-salt structure and is represented by formula:

$$Li[Co_{1-x}M_x]O_2$$

wherein:

$0 \leq x \leq 0.1$; and

M is at least one metal selected from the group consisting of Mg, Al, Ni, Mn, Zn, Fe, Cr, Ga, Mo and W.

3. The cathode active material of claim 1, wherein the cathode active material coated has a hexagonal rock-salt structure and is represented by formula:

$$Li_{1+a}[Ni_{1-x}M_x]O_{2-b}F_b \text{ or } Li_{1+a}[Ni_{1-x}M_x]O_{2-b}S_b$$

wherein:

$0.01 \leq a \leq 0.2$, $0 \leq b \leq 0.1$, $0.01 \leq x \leq 0.5$, and

M is at least one metal selected from the group consisting of Mg, Al, Ni, Mn, Zn, Fe, Cr, Ga, Mo and W.

4. The cathode active material of claim 1, wherein the cathode active material coated has a hexagonal rock-salt structure and has formula:

$$Li_{1+a}[Ni_{1-x-y}Co_xMn_y]O_{2-b}F_b \text{ or } Li_{1+a}[Ni_{1-x-y}Co_xMn_y]O_{2-b}S_b$$

wherein:

$0.01 \leq a \leq 0.2$, $0 \leq b \leq 0.1$, $0.05 \leq x \leq 0.4$, $0.05 \leq y \leq 0.35$, and $0.1 \leq x+y \leq 0$.

5. The cathode active material of claim 1, wherein the cathode active material coated has a hexagonal rock-salt structure and is represented by formula:

$$Li[Li_a(Ni_xCo_{1-2x}Mn_x)_{1-a}]O_{2-b}F_b \text{ or } Li[Li_a(Ni_xCo_{1-2x}Mn_x)_{1-a}]O_2S_b$$

wherein:

$0.01 \leq a \leq 0.2$, $0.05 \leq x \leq 0.5$, $0 \leq b \leq 0.1$.

6. The cathode active material of claim 1, wherein the cathode active material coated has a hexagonal rock-salt structure and is represented by formula:

$$Li[Li_a(Ni_xCo_{1-2x}Mn_{x-0.5y}M_y)_{1-a}]O_{2-b}F_b \text{ or } Li[Li_a(Ni_xCo_{1-2x}Mn_{x-0.5y}M_y)_{1-a}]O_{2-b}S_b$$

wherein:

M is at least one metal selected from the group consisting of Mg, Ca, Cu and Zn;

$0.01 \leq a \leq 0.2$, $0 \leq x \leq 0.5$, $0.01 \leq y \leq 0.1$, and $0 \leq b \leq 0.1$.

7. The cathode active material of claim 1, wherein the cathode active material coated has a hexagonal rock-salt structure and is represented by formula:

$$Li[Li_a(Ni_{1/3}Co_{(1/3-2x)}Mn_{(1/3+x)}M_x)_{1-a}]O_{2-b}F_b \text{ or } Li[Li_a(Ni_{1/3}Co_{(1/3-2x)}Mn_{(1/3+x)}M_x)_{1-a}]O_{2-b}S_b$$

wherein:

M is at least one metal selected from the group consisting of Mg, Ca, Cu and Zn;

$0.01 \leq a \leq 0.2$, $0 \leq x \leq 0.5$, $0.01 \leq y \leq 0.1$, and $0 \leq b \leq 0.1$.

8. The cathode active material of claim 1, wherein the cathode active material coated has a hexagonal rock-salt structure and is represented by formula:

$$Li[Li_a(Ni_xCo_{1-x-y})Mn_xM_y)_{1-a}]O_{2-b}F_b \text{ or } Li[Li_a(Ni_xCo_{1-x-y})Mn_xM_y)_{1-a}]O_{2-b}S_b$$

wherein:

M is at least one metal selected from the group consisting of B, Al M, Fe and Cr;

$0.01 \leq a \leq 0.2$, $0.05 \leq x \leq 0.5$, $0.01 \leq y \leq 0.1$, and $0 \leq b \leq 0.1$.

9. The cathode active material of claim 1, wherein the cathode active material has a hexagonal layered rock-salt structure and is represented by formula is:

$$Li[Li_a(Ni_xCo_{1-2x-y}Mn_{x-0.5z}M_yM'_z)_{1-a}]O_{2-b}F_b \text{ or } Li[Li_a(Ni_xCo_{1-2x-y}Mn_{x-0.5z}M_yM'_z)_{1-a}]O_{2-b}S_b$$

wherein:

M is at least one metal selected from the group consisting of B, Al M, Fe, and Cr;

M' is Mg or Ca;

$0.01 \leq a \leq 0.2$, $0 \leq x \leq 0.5$, $0.01 \leq y \leq 0.1$, and $0.01 \leq b \leq 0.1$.

10. The cathode active material of claim 1, wherein the cathode active material has an olivine structure and is represented by formula: is $$LiM_xFe_{1-x}PO_4$$

wherein:

M is at least one metal selected from the group consisting of Co, Ni and Mn, and $0 \leq x \leq 1$.

11. The cathode active material of claim 1, wherein the cathode active material is a spinel having a cubic structure and is represented by formula:

$$Li_{1+a}[Mn_{2-x}M_x]O_{4-b}F_b \text{ or } Li_{1+a}[Mn_{2-x}M_x]O_{4-b}S_b$$

wherein:

$0.01 \leq a \leq 0.15$, $0 \leq b \leq 0.1$, $0 \leq x \leq 0.1$; and

M is at least one metal selected from the group consisting of Co, Ni, Cr, Mg, Al M, Zn, Mo and W.

12. The cathode active material of claim 1, wherein the cathode active material is a spinel having a cubic structure and is represented by formula:

$$Li_{1+a}(Ni_{0.5}Mn_{2-x}M_x)O_{4-b}F_b \text{ or } Li_{1+a}[Ni_{0.5}Mn_{2-x}M_x]O_{4-b}S_b$$

wherein:

$0.01 \leq a \leq 0.15$, $0 \leq b \leq 0.1$, $0 \leq x \leq 0.1$; and

M is at least one metal selected from the group consisting of Co, Ni, Cr, Mg, Al M, Zn, Mo and W.

* * * * *